(12) United States Patent
Pögel (10) Patent No.: US 11,663,835 B2
(45) Date of Patent: May 30, 2023

(54) METHOD FOR OPERATING A NAVIGATION SYSTEM (71) Applicant: Volkswagen Aktiengesellschaft, Wolfsburg (DE)

(72) Inventor: Tobias Pögel, Schwülper (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 262 days.

(21) Appl. No.: 16/753,369

(22) PCT Filed: Oct. 4, 2018

(86) PCT No.: PCT/EP2018/077047
§ 371 (c)(1),
(2) Date: Apr. 3, 2020

(87) PCT Pub. No.: WO2019/068827
PCT Pub. Date: Apr. 11, 2019

(65) Prior Publication Data
US 2020/0333144 A1 Oct. 22, 2020

(30) Foreign Application Priority Data
Oct. 5, 2017 (DE) .............. 10 2017 217 747.0

(51) Int. Cl.
G06V 20/56 (2022.01)
G06F 16/29 (2019.01)
(Continued)

(52) U.S. Cl.
CPC ....... G06V 20/588 (2022.01); G01C 21/3602 (2013.01); G01C 21/3632 (2013.01); G06F 16/29 (2019.01); G06F 16/9024 (2019.01)

(58) Field of Classification Search
CPC ........... G01C 21/32; G01C 21/3602; G01C 21/3632; G06F 16/29; G06F 16/9024; G06V 20/588
See application file for complete search history.

(56) References Cited

U.S. PATENT DOCUMENTS 8,467,962 B2 * 6/2013 Irie .................... G01C 21/3658
701/428
8,594,926 B2 11/2013 Kang ........................ 701/438
(Continued)

FOREIGN PATENT DOCUMENTS

CN 101755293 A 6/2010 ........... G08G 1/0962
DE 10327869 A1 1/2005 ............. G01C 21/34
(Continued)

OTHER PUBLICATIONS

English Translation of WO-2017013792-A1.*
(Continued)

Primary Examiner — Rami Khatib
Assistant Examiner — Gabriel Joseph Rene Lambert
(74) Attorney, Agent, or Firm — Slayden Grubert Beard PLLC (57) ABSTRACT The invention relates to a method for operating a navigation system. A route is first ascertained from a starting location to a target location using digital map data. At least one intersection point of the route ascertained in this manner is selected, and a database entry linked to said intersection point is read out. Read-out maneuvering information is used in order to ascertain a maneuver to be performed at the selected intersection point and in order to lastly output a navigation instruction corresponding to the ascertained maneuver. The invention additionally relates to a navigation system which is designed to perform the method, to a (Continued)

vehicle comprising the navigation system, and to a method for storing maneuvering information.

15 Claims, 3 Drawing Sheets (51) Int. Cl.
*G06F 16/901* (2019.01)
*G01C 21/36* (2006.01)

(56) References Cited

U.S. PATENT DOCUMENTS

| | | | |
|---|---|---|---|
| 8,953,838 B2 | 2/2015 | Chen et al. ................ 382/103 | |
| 9,182,243 B2 | 11/2015 | Van Os et al. | |
| 9,701,241 B2 | 7/2017 | Raghu et al. | |
| 9,791,288 B2 | 10/2017 | Mueller | |
| 10,175,055 B2 | 1/2019 | Mayrhofer et al. | |
| 2005/0102095 A1 | 5/2005 | Vanegas et al. ............ 701/437 | |
| 2008/0243378 A1* | 10/2008 | Zavoli ................ G01C 21/30 701/533 | |
| 2011/0285717 A1* | 11/2011 | Schmidt ............ G01C 21/3658 345/441 | |
| 2014/0343842 A1* | 11/2014 | Ranganathan ......... G01C 21/30 701/472 | |
| 2015/0160032 A1* | 6/2015 | Han ................ G01C 21/3658 701/117 | |
| 2016/0223346 A1* | 8/2016 | Mayrhofer ............... H04N 7/18 | |
| 2016/0334238 A1* | 11/2016 | Harayama .......... G01C 21/3644 | |
| 2019/0390973 A1* | 12/2019 | Kondo ............... G01C 21/3815 | |

FOREIGN PATENT DOCUMENTS

| | | | |
|---|---|---|---|
| DE | 102004013440 A1 | 10/2005 | ............ G01C 21/36 |
| DE | 102006010478 A1 | 9/2007 | ............ G01C 21/36 |
| DE | 102007053305 A1 | 5/2009 | ............ G01C 21/34 |
| DE | 112007003384 T5 | 12/2009 | ............ G01C 21/36 |
| DE | 112013002792 T5 | 3/2015 | ............ G01C 21/26 |
| DE | 102013224307 A1 | 5/2015 | ............ G01C 21/36 |
| DE | 102014207541 A1 | 10/2015 | ........... B60W 10/04 |
| DE | 102015004676 A1 | 12/2015 | ........... B60W 40/02 |
| DE | 102014224810 A1 | 6/2016 | ............ G01C 21/36 |
| DE | 102017217747 A1 | 4/2019 | ............ G01C 21/34 |
| EP | 2162849 B1 | 3/2014 | ............ G01C 21/30 |
| EP | 2482036 B1 | 5/2015 | ............ G01C 21/32 |
| JP | 2013185893 A | 9/2013 | ............ G01C 21/26 |
| WO | WO-2017013792 A1 * | 1/2017 | ............ G01C 21/26 |
| WO | 2019/068827 A1 | 4/2019 | ............ G01C 21/32 |

OTHER PUBLICATIONS

German Office Action, Application No. 102017217747.0, 5 pages.
International Search Report and Written Opinion, Application No. PCT/EP2018/077047, 20 pages.
Chinese Office Action, Application No. 201880064849.1, 11 pages.

* cited by examiner

METHOD FOR OPERATING A NAVIGATION SYSTEM

CROSS-REFERENCE TO RELATED APPLICATIONS

This application claims priority to German Patent Application No. DE 10 2017 217 747.0, filed on Oct. 5, 2017 with the German Patent and Trademark Office. The contents of the aforesaid Patent Application are incorporated herein for all purposes.

TECHNICAL FIELD

The invention relates to a method for operating a navigation system, and a navigation system configured to perform the operating method according to the invention. Furthermore, the invention relates to a method for storing maneuvering information, and a vehicle with a navigation system according to the invention.

BACKGROUND

Navigation systems are used in order to determine a route from a certain starting location, generally the current position of the user, to a certain target location. Navigation systems are used in particular in motor vehicles such as passenger vehicles or trucks, and in this regard can be configured as an integrated component of the motor vehicle. Increasingly, however, mobile terminals such as smart phones or tablets in which corresponding applications are installed are used as navigation systems.

To determine a route between a starting location and target location along a road network, a navigation system accesses a digital road map. The road network therein is generally saved in the abstract form of a graph with a plurality of nodes and edges connecting these nodes. Each node corresponds to a certain location of the road network, and each edge corresponds to an actually existing connection between these locations. In particular in the field of the automotive industry, the NDS (navigation data standard) is used as a standardized format for such digital map data.

Since a starting location and target location are each assigned to a node of such a digital road map, a navigation system can determine a route between these locations along the existing edges by means of suitable algorithms. Furthermore, the route can be optimized with respect to a certain order parameter such as route length or anticipated driving time for which additional information may be necessary in the navigation system. This additional information is assigned to certain edges of the map data, frequently by a geographic position as a reference value, for example by means of Open-LR.

Both the digital road map as well as the additional information can be available in a memory of the navigation system. A route calculation is then possible without an existing data link (off-line). Alternatively or in addition, map data, additional information or corresponding update data may be saved on an external server and retrieved from the navigation system only as needed. Furthermore, the route may also be determined on the external server, wherein the navigation system only serves as input and output means, as well as to determine the position. Such an online route calculation is frequently performed by applications of mobile terminals.

In order to follow the ascertained route between the starting and target location, it is necessary for a user to perform a certain maneuver at each node such as "turn right". For this, navigation instructions for example in acoustic or visual form corresponding to the certain maneuvers are output for the user. To date, the maneuvers to be performed along the route have primarily been determined using the geometric relationships between sequential edges. The algorithms used for this are however error-prone, in particular in complex intersection situations with many lanes and/or traffic islands. Deviations between the navigational instructions and real road layout can then lead to misinterpretations as well as stressful situations for the driver.

To date, it has primarily been attempted to improve the output of navigation instructions in order to bring them into better conformity with a road layout experienced by the user. Accordingly, DE 10 2006 010 478 A1 discloses a method in which a current vehicle environment recorded by means of a camera is shown together with a navigation instruction, for example in the form of an arrow on a display unit. In this case as well, there exists the danger of confusion and stress on the part of the user, for example when the navigation instruction and a direction indicator actually on the roadway deviate from each other.

SUMMARY

The invention is based on the object of improving the navigation from a starting location to a target location by minimizing a deviation between the navigation instruction output to a user and a road situation experienced by the user. This should prevent user confusion and stress, in particular in complex intersection situations, and therefore reduce the probability of an accident.

The object is solved by a method for operating a navigation system, a navigation system, a method for storing maneuvering information, as well as a vehicle with a navigation system having the features of the independent claims. Embodiments of the invention are the discussed in the dependent claims and the following description.

BRIEF DESCRIPTION

IN THE FIGS.:

DETAILED DESCRIPTION

A first exemplary aspect of the invention relates to a method for operating a navigation system that at least comprises the steps described below. In a first step of the method according to the present aspect, a route is ascertained from a starting location to a target location using digital map data. The route is, for example ascertained in the navigation system. Alternatively, the route is calculated on an external server, and the navigation system is only used for guidance along the ascertained route. Within the context of the present application, a route may for example designates a quantity of nodes and edges of a directed graph between a starting node corresponding to the starting location and a target node corresponding to the target location. The route therefore represents a clear connection between the starting location and the target location.

In a next step of the method according to the present aspect, at least one intersection point of the ascertained route is selected. Within the context of this application, an intersection point designates at least one triple of a node and the edges directly adjacent to this node. For complex intersection situations, an intersection point can however consist of a plurality of nodes, the edges connecting these nodes, as well as two additional edges. In a following step, maneuvering information linked to the selected intersection point is read out from a database entry. In an embodiment, first there is a check as to whether a database entry on the selected intersection point exists. Thereupon is a check in another step as to whether the ascertained database entry contains maneuvering information linked to the selected intersection point. If these checks lead to a positive result, the linked maneuvering information is read out of the database by the navigation system. The database entry, and/or separately the maneuvering information contained therein, may, e.g., be linked by geographic coordinates to the selected intersection point (such as Open-LR). Alternatively, all intersection points of this route may, e.g., be selected directly after ascertaining the route, and the other steps of the method according to the present aspect are performed for all of these intersection points.

The above-described checks are for example restricted to the digital map data available to the navigation system, particularly for example to digital map data stored in the internal memory of the navigation device. In an embodiment, the checks may furthermore be carried out in at least one external database, for example by accessing an external server by means of a wireless interface and the Internet. If a database entry linked to the selected intersection point is ascertained on the external server, the maneuvering information contained therein is read out by the navigation system and may for example be saved locally in the navigation system with reference to the selected intersection point. In an embodiment, there is a query for potential updates to the database entry on an external server in addition to identifying a database entry link to the selected intersection point.

In a next step of the method according to the present aspect, a maneuver is furthermore ascertained using the read-out maneuvering information. In the context of the present application, maneuvering information designates information with reference to a maneuver to be performed at the intersection point. In an embodiment, the maneuvering information contains information on at least one angle value between the at least two edges of an intersection point. Alternatively, the maneuvering information in an embodiment contains specific maneuvering information such as an instruction for straight driving (straight, S), an instruction for a 90° left or right turn, an instruction for a 45° left or right turn, or an instruction for a 180° turning maneuver. Moreover, the maneuvering information in an embodiment contains additional information such as for example on the presence of a separate turn lane or a green right turn arrow. If the selected intersection point is a complex intersection for example with many lanes, traffic islands, stoplights and/or at least a section of circular lane guidance, the read-out maneuvering information in an embodiment contains information on maneuvering sequences to be performed. Maneuvering sequences contain information on a sequence of maneuvers to be performed at the intersection point such as for example follow a first lane, change a lane to a second lane, and turn therefrom with a specific angular value to the ongoing route.

In this context, it is noted that the ascertained route already contains the basic directional information to continue driving from the intersection point, i.e., as to whether for example an access road (first edge) leading to the node should be followed, or if there is a switch to a different road (second edge) after the node. The maneuvering information according to the present aspect also contains information on the maneuver to be performed at the selected intersection point and corresponding to the ascertained route.

In a last step of the method according to the present aspect, a navigation instruction corresponding to the ascertained maneuver is finally output by the navigation system. Accordingly, the user of the navigation system is informed about the maneuver to be performed at the intersection point, for example by visual and acoustic output.

In known methods, the maneuver(s) to be performed at a selected intersection point is/are determined mathematically from the angular relationships between edges belonging to the intersection point. These calculations are however error-prone, in particular in complex intersection geometries with many lanes and driving directions. Moreover, the necessary computing performance required for such calculations varies depending on the intersection geometry. Accordingly, the danger exists that the maneuvers will be ascertained late in complex intersection situations, and the navigation instructions ascertained using the calculated maneuver will differ from the situation actually experienced by the driver.

In the method according to the present aspect for operating a navigation system, the maneuver to be performed at a selected intersection point is determined in a prioritized manner founded on the database, i.e., without computational access to the digital map data. The method therefore makes it possible to determine maneuvers by means of a simple evaluation logic and simultaneously ensures that the generated maneuver largely corresponds to the actually existing situation. Consequently, the user's experience is improved by means of this method, and the necessary computer resources are simultaneously reduced.

In an embodiment of the method, the read-out maneuver information relates to a turn arrow linked to the selected intersection point. Digital map data are increasingly being enriched with more details, which also includes information on the position of turn arrows and often their position as well. According to this embodiment of the method, angle information of the turn arrow is therefore, e.g., read out from the database entry, and a maneuver is ascertained using the read out angle information. To date, information on road markers contained in map data such as turn arrows or painted traffic signs are used exclusively to improve the positioning of a navigation system (vehicle), i.e., for map matching. According to the present aspect, the information contained in the map data, e.g., the contained angle information on turn arrows, is however used to ascertain maneuvers. In doing so, the maneuver to be performed corresponds to the read-out angle information in the simplest case. Beneficially, an optical navigation instruction in the form of an arrow created using the ascertained maneuver largely corresponds to a real turn arrow perceived by the user. Driver stress situations can therefore be prevented.

In another embodiment of the method, the at least one intersection point is selected depending on a current position of the navigation system, or respectively the vehicle containing the navigation system. For example, an intersection point is selected once its distance from the navigation system falls below a predetermined limit value. By appropriately selecting the limit value, it can be ensured that the maneuver is ascertained, and therefore the navigation instruction is output in a timely manner. For example, the limit value depends on the speed and increases for example with increasing speed. Moreover, other sensor data such as for example incline data can be used to adapt the limit value. Accordingly, the visibility of an intersection point can be beneficially taken into account.

To the extent that no database entry or maneuver information on the selected intersection point is ascertained in the method according to the present aspect, a maneuver may be, e.g., calculated using the digital map data. In other words, if the nonexistence of a database entry on the intersection point, or the nonexistence of maneuver information in a database entry that exists on the intersection point is ascertained in the method according to the present aspect, a maneuver to be performed at the intersection point is ascertained using the digital map data. In an embodiment, the maneuver is calculated in this case using the angle geometry between the edges belonging to the intersection point by means of suitable algorithms.

In an exemplary implementation of the method, the read-out maneuver information is furthermore compared with the ascertained route. The route information contains information on the road leading to a node of an intersection point and the road leading away from the node. For example, an indicator is derived from the route information for a maneuver to be performed at the intersection point. In doing so, the indicator distinguishes at least between left curve, right curve and straight-ahead driving. In a next step, e.g., using such an indicator, it is established whether a discrepancy exists between the maneuver information and the route. Such a discrepancy is established to the extent that a deviation between the read-out maneuver and the ascertained route exceeds a predetermined limit value. If a discrepancy is established, the navigation system ascertains a maneuver using the digital map data, for example as explained above, and outputs a navigation instruction corresponding to this movement.

In an exemplary implementation of the method, an intersection point of the ascertained route has at least one node and always two edges of a directed graph connected to this at least one node. Furthermore, an angle between the at least two edges of the intersection point is determined with known methods. Furthermore, angle information may, e.g., be read out from the database entry linked to the intersection point. According to this implementation, the above-described discrepancy is established if a difference between the calculated angle and the read-out angle information exceeds a predetermined limit value.

In an exemplary embodiment of the method, database entries are furthermore updated or created with maneuver information. According to this embodiment, a road surface is recorded at the at least one intersection point by a camera system. If the navigation system is arranged in a vehicle, the vehicle environment is, e.g., recorded, in particular in the front region of the vehicle. By means of an evaluation unit that may, e.g., be a part of the calculation module of the navigation system, a turn arrow is furthermore recognized, or respectively identified on the road surface recorded at the at least one intersection point. By means of the evaluation unit, angle information of the recognized turn arrow is then ascertained, for example by means of image analysis. Finally, a database entry linked to the at least one intersection point is created or updated with the ascertained angle information. An existing database entry linked to the intersection point is found, or respectively a newly created database entry linked to the intersection point is indexed such as using geographic coordinates, for example by means of Open-LR.

For example, database entries with maneuver information are updated or created as a reaction to the ascertainment of the nonexistence of a database entry linked to the intersection point, or the ascertainment of the nonexistence of maneuver information linked to the intersection point, or the establishment of a discrepancy between the read-out maneuver information and the ascertained route.

A method for storing maneuver information that has at least the steps explained below is also the subject of the present teachings. According to this method, a road surface is recorded at at least one intersection point by a camera system. In this case, the intersection point is a component of a route ascertained using digital map data between a starting location and a target location. If the camera system is arranged in a vehicle, the vehicle environment may, e.g., be recorded, in particular in the front region of the vehicle. By means of an evaluation unit that is for example part of a calculation module of a navigation system, a turn arrow is then recognized on the recorded road surface, e.g., by means of segmenting and pattern recognition. By means of the evaluation unit, angle information of the recognized turn arrow is then ascertained. Finally, a database entry linked to the at least one intersection point is created or updated with the ascertained angle information, may be, e.g., in a set of digital map data of a navigation system. Alternatively, an additional database is created that can be accessed by the navigation system.

An existing database entry linked to the intersection point is found, or respectively a newly created database entry linked to the intersection point may be indexed by using geographic coordinates (Open-LR).

A navigation system that has at least the components described below is also the subject of the present teachings. The navigation system according to this aspect has a positioning module which is configured to determine an absolute position of the navigation system in space. For example, the positioning module is configured to determine the position by means of GPS, AGPS, mobile communications and possibly other sensors. Furthermore, a map module configured for accessing digital map data is provided that accesses a local memory, and/or retrieves the map data from an external server. An input and output module of the navigation system is configured to receive information from and to output information to a user, and is, e.g., at least partially designed as a touch-sensitive display. The navigation system discussed herein furthermore has a calculation module that is connected to the positioning module, the map module and the input and output module, and is configured to ascertain a route from a starting location to a target location using a determined absolute position of the navigation system and the digital map data, and by information entered through the input and output module, to select at least one intersection point of the ascertained route, to read out a database entry containing maneuvering information linked to the selected intersection point, and to calculate a maneuver using the read-out maneuver information. The navigation system according to the present aspect may for example be configured to perform the method for operating a navigation system.

A further aspect relates to a vehicle with a navigation system according to the preceding aspect as described above. In this case, the navigation system is for example configured to perform the operating method according to the preceding discussion as described above. For example, the navigation system is also configured to perform the before mentioned method for storing maneuvering information.

Electrical or electronic devices such as for example the navigation system according to the preceding and/or other relevant assemblies or components thereof according to the embodiments discussed herein can be implemented with suitable hardware, firmware (such as for example an application-specific integrated circuit—ASIC), software, or combinations of software, firmware or hardware.

Examples are various components of the navigation system according to the teachings herein, such as the positioning module or the map module, at least partially configured on a common integrated circuit, or in a plurality of integrated circuits. Furthermore, the various components of the device may at least be partially configured using a flexible printed circuit board, a printed circuit board (PCB), or a lithographically structured substrate. Furthermore, the various components of these devices may be configured as a process or thread that runs in one or more processors, executes computer program instructions and interacts with other system components in order to realize the functionalities described herein. The corresponding computer program instructions are in this case for example stored in a memory that is for example realized in a computer as a standard memory apparatus such as for example a random access memory (RAM). The corresponding computer programs may alternatively be saved on static data carriers such as for example a CD-ROM, a flash memory, or the like. In the context of the present invention, the functionalities of various data processing devices can both be executed together in a single data processing device as well as distributed over several data processing devices.

Other embodiments result from the remaining features specified in the dependent claims.

The various embodiments mentioned in this application may beneficially be combined with one another, unless designed otherwise in individual cases.

The invention will be explained in further exemplary embodiments below based on the associated drawings.

Figure 1:
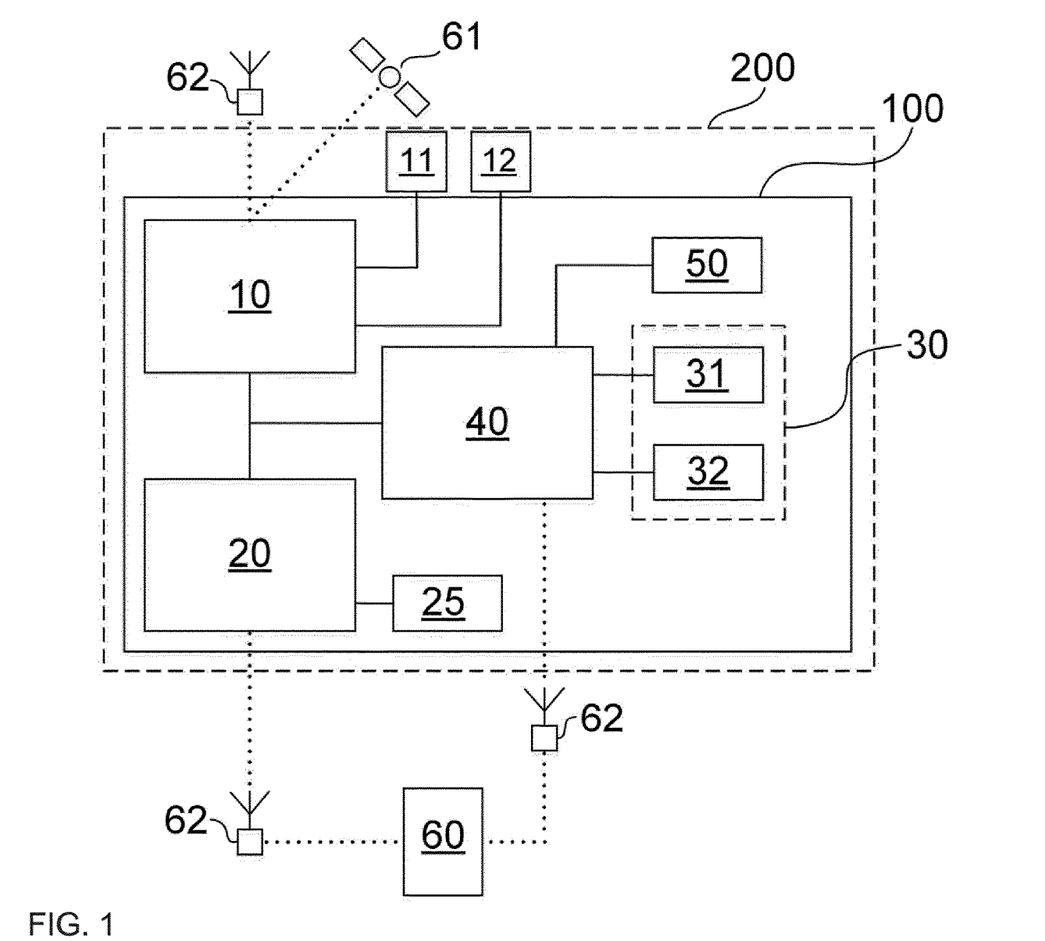
FIG. 1 shows a schematic representation of a vehicle according to an embodiment.

FIG. 1 shows an overall navigation system designated 100 according to an embodiment. The navigation system 100 in this case is arranged in a vehicle 200. Nonetheless, the navigation system 100 can also be arranged in a mobile terminal such as a smart phone or tablet. The navigation system 100 can be arranged as a single component within the vehicle 200. Alternatively, various components of the navigation system 100 can be distributed within the vehicle 200, or respectively integrated in various components of the vehicle.

The navigation system 100 comprises a positioning module 10 for ascertaining a position of the navigation system 100, and therefore also of the vehicle 200. For example, the positioning module 10 is designed as a transceiver for the global positioning system (GPS) and is furthermore linked to a plurality of GPS satellites 61. In addition, the positioning module 10 can access other sources for determining position, in particular by means of an air interface. According to FIG. 1, the positioning module 10 is furthermore linked to a mobile communications base station 62 and is for example accordingly capable of using position data provided by the mobile communications base station 62 to initialize GPS positioning (assisted GPS (AGPS)).

Alternatively or in addition, the positioning module may also be wirelessly linked to transponders of a traffic management system. Moreover, the positioning module 10 is linked to sensors 11, 12 of the vehicle 200. To the extent that the navigation system 100 is integrated in the vehicle 200, the sensors can also be considered as components of the vehicle. The sensors are in particular a speed sensor 11 such as a wheel rotational speed sensor, and a tilt sensor 12 such as a gyroscope. By means of these sensors, 11, 12, positioning can be further improved, and possibly a future position of the navigation system 100 and vehicle 200 can be approximated.

The navigation system 100 furthermore has a map module 20 that has access to digital map data. According to FIG. 1, the map module 20 has access to a memory of the navigation system 100 in which the digital map data are saved. Furthermore, the map module 20 is linked by a wireless interface such as a mobile communications base station 62 and the Internet to an external server 60. The digital map data are either stored by the manufacturer in the memory 25, or are retrieved from the server 60 when the navigation system 100 is initially started up. Moreover, updates of the map data can be retrieved wirelessly from the server 60.

An input and output module 30 of the navigation system 100 has an input module 31 as well as an output module 32. The input module 31 comprises a keyboard, a rotary switch, a microphone and/or a touch-sensitive surface. The output module 32 comprises a microphone, a haptic surface, a holographic imaging device and/or a screen. For example, the screen may be designed as a touch-sensitive surface (touchscreen) and is accordingly both part of the input module 31 as well as the output module 32.

A calculation module 40 of the navigation system 100 is linked to the positioning module 10, the map module 20 as well as the input and output module 30. An ascertained current position of the navigation system 100 from the positioning module 10 and at least one section of the digital map data from the map module 20 are transferred to the calculation module 40. The calculation module 40 is configured to first determine a current position of the navigation system 100 on the map (map matching) using the transferred position and map data. From the input and output module 30, the calculation module 40 receives an input from a user concerning a target location for which route planning is desired.

The calculation module 40 is configured to calculate a route from the current position as the starting location to a target location corresponding to the input by means of well-known methods using the current position, the digital map data and the target input. To accomplish this, the calculation module 40 uses algorithms from graph theory, such as the algorithm by Dijkstra, and/or the Bellman-Ford algorithm. Moreover, the calculation model 40 is designed to perform dead reckoning and continuously receives the current position from the positioning module 10 for this. Moreover, the route calculation can be improved by continuous map matching and the inclusion of sensor data (sensor fusion). Alternatively, the route calculation can however also be performed by an external server 60 to which the calculation module 40 is linked by a mobile communications base station 62. In this case, the calculation module 40 forwards at least the current position and the entered target location to the server 60.

The calculation module 40 is furthermore configured to perform guidance. In doing so, the calculation module 40 determines the maneuvers to be performed by the user at each intersection point, or respectively node of the ascertained route. In doing so, the maneuvers are determined already when calculating the route and/or always when approaching an intersection point. The calculation module 40 furthermore outputs a navigation instruction corresponding to the determined maneuvers through the output module 32 to the user. Alternatively, maneuvers are determined on the external server 60 that transfers the maneuvers, or directly corresponding navigation instructions, to the calculation module 40.

The navigation system 100 shown in FIG. 1 furthermore has a camera system 50 that is configured to record a road surface as well as to transfer the recorded images of the road surface to the calculation module 40. In this context, the calculation module 40 is furthermore designed for image analysis such as for performing segmentation and pattern recognition in the received images.

Figure 2:
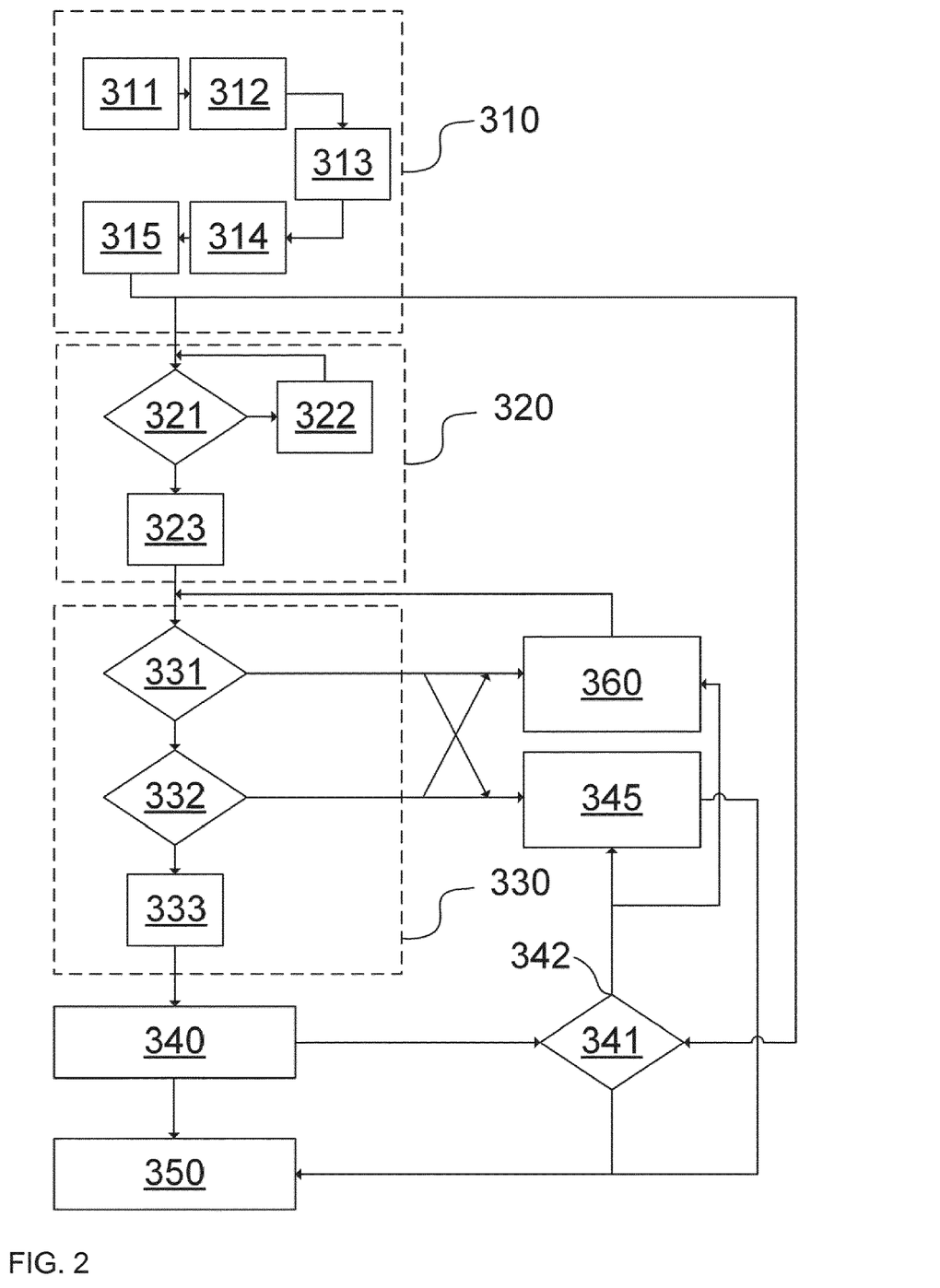
FIG. 2 shows a schematic representation of a process flow according to a first embodiment.

FIG. 2 shows a schematic block diagram of a method for operating a navigation system 100. In this case, blocks shown within dashed blocks represent exemplary method steps to which the invention is not restricted.

In a first step S310 of the method, a route is ascertained from a starting location to a target location using digital map information.

In doing so in a first intermediate step S311, a target location is input by means of an input module 31 of the navigation system 100, and this input is forwarded to the calculation module 40. In a second intermediate step S312, a positioning module 10 ascertains a current position of the navigation system 100 by means of GPS and forwards it to the calculation module 40. In a third intermediate step S313, a map module 20 retrieves digital map data from a local memory 25 of the navigation system 100 or an external server 60 and forwards it at least partially to the calculation module 40. Using the received data, the calculation module 40 determines the current position of the navigation system 100 on the digital map in an intermediate step S314 (map matching). In step S315, the calculation module 40 finally determines a route between a starting node corresponding to the current position and a target node corresponding to the target entry by using the digital map data. In this case, the route is a subset of digital map data consisting of nodes and edges that together form a link from the starting node to the target node.

In a second step S320 of the method, a selection occurs of at least one intersection point along the ascertained route. The selection is performed in this case depending on the current position of the navigation system 100. In this case, it is checked in a first intermediate step S321 whether a distance between the current position of the navigation system 100 provided by the positioning module 10 and an intersection point of the ascertained route falls below a predetermined limit value. If this query reveals that there is no intersection point within a certain radius around the current position, the current position of the navigation system 100 is updated in an intermediate step S322, and the distance check is resumed in step S321. If an intersection point of the route is ascertained in S321 that is located around the current position within a predetermined radius, this intersection point is selected in intermediate step S323.

In a third step S330 of the method, a database entry linked to the intersection point selected in S323 is read out. To accomplish this, initially it is checked in a first intermediate step S331 whether a database entry linked to the intersection point in fact exists. This check can be done both in an internal memory 25 as well as on an external server 60. If a corresponding database entry is ascertained in this check, it is further checked in intermediate step S332 whether this database entry contains maneuvering information linked to the intersection point, in particular angle information of a turn arrow. If corresponding maneuvering information is ascertained in this check, it is read out in intermediate step S333 by the calculation module 40.

In a step S340 of the method, a maneuver to be performed by the user of the navigation system 100 at the selected intersection point is ascertained by the calculation module 40 using the read-out maneuvering information, in particular from the angle information of a turn arrow. If one of the checks in the intermediate steps S331, S332 produces a negative result, i.e., if the nonexistence of a database entry or maneuvering information for the selected intersection point is established, a maneuver to be performed at the selected intersection point is in contrast ascertained by using the digital map data in a step S345.

In a step S350 of the method, the calculation module 40 checks whether a maneuver determined using the maneuvering information was ascertained and, in addition, whether a maneuver determined using the digital map data was ascertained. If only the maneuver ascertained from the read-out maneuvering information exists, a navigation instruction is created using this maneuver in step S350 and read out to a user through the output module 32. If however a maneuver ascertained using the digital map data also exists in the calculation module 40, a navigation instruction is created exclusively therefrom in step S350 and output to a user through the output module 32. The same holds true to the extent that a discrepancy is established (S342) in a comparison of the read-out maneuvering information with the ascertained route in intermediate step S341. In this case as well, the maneuver is ascertained using digital map data (S345), and a corresponding instruction is output in S350.

Moreover, a negative result in each of the intermediate steps S331, S332 and S341 (S342) leads to a recording of a road surface by means of a camera system 50 at the intersection point selected in S323. The image of the road surface recorded in this manner is furthermore analyzed for the presence of a turn arrow by an evaluation unit that may, e.g., be part of the calculation module 40. If a turn arrow is identified in the recorded image, the evaluation unit furthermore ascertains angle information of the recognized turn arrow. The angle information ascertained in this manner, i.e., indicated angles of 45° (turn slightly right), 90° (turn right), 180° (U-turn), or 315° (turn slightly left) are finally saved as updated maneuvering information in a database entry already linked to the intersection point. Alternatively, a new database entry linked to the intersection point containing the ascertained angle information as maneuvering information is created. Renewed queries S331, S332, for example in a recalculation of this route during another trip or for another user then lead to positive results. The steps described in this paragraph may in principle also be performed independently of the operating method discussed herein FIG. 3 shows a schematic comparison of a road situation with a graphic navigation instruction that is output by a navigation system 100 according to (A) the prior art and (B) an embodiment of the method according to the teachings herein.

Figure 3:
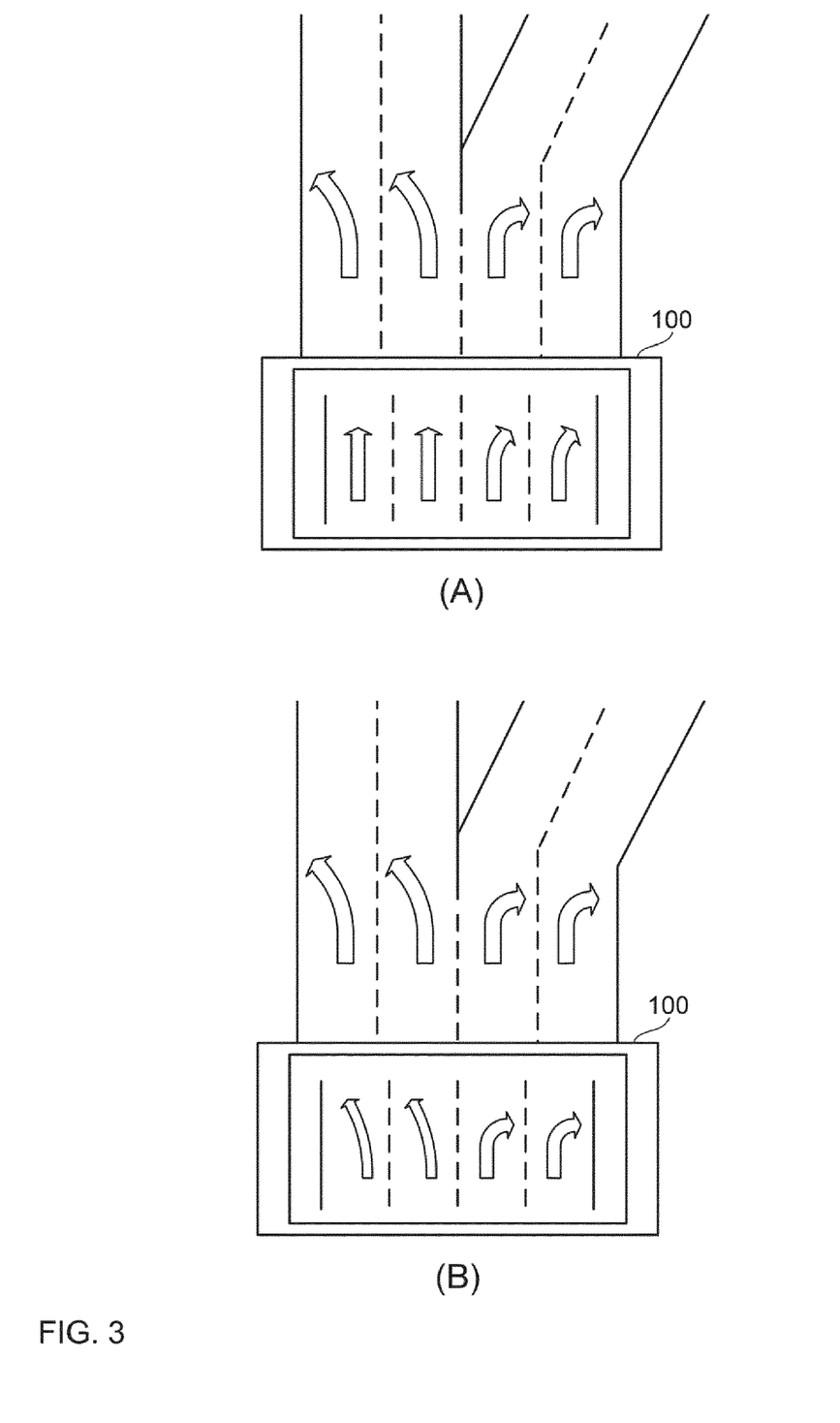
FIG. 3 shows a schematic comparison of a road situation and a graphic navigation instruction according to (A) the prior art and (B) according to an embodiment.

The road situation shown in FIG. 3 makes no claim to corresponded to a real road situation and only serves to illustrate a positive effect of the teachings herein. As shown in the road situation in FIG. 3, a four-lane road is divided at an intersection point into a two-lane route that continues straight ahead and a two-lane route that angles off about 45° to the right. In the driving direction in front of the intersection point, two identical turn arrows are applied on the road surface of two left lanes of the four-lane road. These turn arrows angle off slightly to the left approximately at an angle of about 45°. Two turn arrows are also applied to the two right lanes at the same height which distinctly angle off to the right, approximately at an angle of 85°.

As shown in FIG. 3A, navigation instructions are output on the navigation system 100 which, according to the prior art, were ascertained using the angle geometry of the streets (edges) before and after the intersection point. Since the two left traffic lanes run straight through the intersection point unchanged, straight arrows were created as navigation instructions for these two lanes. Arrow-shaped navigation instructions were created for the two right lanes which also angle off by about 45° to the right corresponding to the trajectory of these lanes. As can be seen in FIG. 3A, a contradiction therefore results between the navigation instructions and the roadway markers in situations in which roadway markers, in particular turn arrows, deviate from the real road trajectory. This can lead to confusion in a user of the navigation system 100 and therefore disadvantageously affect his traffic safety.

As shown in FIG. 3B, navigation instructions are output on the navigation system 100 which are largely identical to the markers applied to the road. These navigation instructions were ascertained according to the method as discussed herein in that the navigation system 100 has read out maneuvering information from a database, e.g., from the digital map data stored in the local memory 25, upon approaching the intersection point. In this case, a turn arrow has been stored as maneuvering information as an object together with its attributes: geographic length, geographic width, angle information and position of the lane. A link to the intersection point is made by the geographic coordinates. The angle information provides the direction of the arrow tip relative to the standard driving direction depicted in a full circle.

By using this read-out angle information, the navigation system 100 has ascertained maneuvers to be performed at the intersection point for the lanes following an ascertained route, as well as its corresponding arrow-shaped navigation instructions. In FIG. 3B, the navigation instructions for all four lanes are shown only to illustrate a beneficial effect. Actually, the navigation system 100 would only ascertain and display maneuvers and navigation instructions for the two left or two right lanes following the ascertained route. As shown in FIG. 3B, the navigation instructions almost entirely correspond to the actual roadway markers so that recognition by the user is enhanced who drives more calmly and less stressed through the intersection point.

LIST OF REFERENCE NUMBERS

100 Navigation system
200 Vehicle
10 Positioning module
11 Speed sensor
12 Tilt sensor
20 Map module
25 Memory
30 Input and output module
31 Input module
32 Output module
40 Calculation module
50 Camera system
60 External server
61 GPS satellite
62 Mobile communications base station The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating a navigation system comprising:
    determining a current position using a GPS receiver;
    ascertaining a route from the current position as a starting location to a target location using digital map data;
    selecting at least one intersection point of the ascertained route;
    reading out a database entry containing maneuvering information linked to the selected intersection point, which maneuvering information comprises at least angle information on at least one roadway marker, which angle information is separate from intersection geometry information of the at least one intersection point;
    ascertaining a maneuver using the read-out maneuvering information;
    generating a navigation instruction corresponding to the ascertained maneuver, comprising generating a display of at the least one roadway marker using the angle information, so that the display is largely identical to a marker on a road at the selected at least one intersection point; and
    outputting the navigation instruction corresponding to the ascertained maneuver.

2. The method of claim 1, wherein the maneuvering information relates to a turn arrow linked to the selected intersection point, the method furthermore comprising:
    reading out the angle information of the turn arrow from the database entry; and
    outputting the navigation instruction using the read-out angle information.

3. The method of claim 2, comprising:
    determining, whether angle information is present on the selected at least one intersection point; and
    in case no angle information is present on the selected at least one intersection point, calculating the display using angle geometry between two edges of the selected at least one intersection point, comprised in the digital map data.

4. The method of claim 2, comprising:
    comparing the read-out maneuvering information with the ascertained route;
    determining, whether a discrepancy between the maneuvering information and the route is given; and
    in case the discrepancy is given, calculating the maneuver using the digital map data.

5. The method of claim 2, wherein the at least one intersection point has at least one node and in each case two edges of a directed graph linked to the at least one node.

6. The method of claim 1, comprising:
    determining, whether angle information is present on the selected at least one intersection point; and
    in case no angle information is present on the selected at least one intersection point, calculating the display using angle geometry between two edges of the selected at least one intersection point, comprised in the digital map data.

7. The method of claim 6, comprising:
comparing the read-out maneuvering information with the ascertained route;
determining, whether a discrepancy between the maneuvering information and the route is given; and
in case the discrepancy is given, calculating the maneuver using the digital map data.

8. The method of claim 6, wherein the at least one intersection point has at least one node and in each case two edges of a directed graph linked to the at least one node.

9. The method of claim 1, comprising:
comparing the read-out maneuvering information with the ascertained route;
determining, whether a discrepancy between the maneuvering information and the route is given; and
in case the discrepancy is given, calculating the maneuver using the digital map data.

10. The method of claim 9, wherein the at least one intersection point has at least one node and in each case two edges of a directed graph linked to the at least one node.

11. The method of claim 1, wherein the at least one intersection point has at least one node and in each case two edges of a directed graph linked to the at least one node.

12. The method of claim 1, comprising:
calculating an angle between at least two edges of the intersection point;
determining that a discrepancy is given when a difference between the calculated angles and read-out angle information exceeds a predetermined limit value.

13. The method of claim 1, comprising:
recording a road surface using a camera system at the at least one intersection point of the route;
recognizing a turn arrow on the recorded road surface;
ascertaining angle information of the recognized turn arrow; and
creating or updating a database entry linked to the at least one intersection point using the ascertained angle information.

14. A navigation system comprising:
A positioning module configured to determine a position of the navigation system;
a map module configured for accessing digital map data;
a display device configured to receive information from and to output information visually to a user; and
a processor connected to the positioning module, the map module, and the input and output module,
wherein the processor is configured to:
    ascertain a route from a starting location to a target location using a determined absolute position of the navigation system, the digital map data, and information entered through the input and output module;
    select at least one intersection point of the ascertained route;
    read out a database entry containing maneuvering information linked to the selected intersection point, which maneuvering information comprises at least angle information on at least one roadway marker, which angle information is separate from intersection geometry information of the at least one intersection point;
    ascertain a maneuver using the read-out maneuver information;
    generate a navigation instruction corresponding to the ascertained maneuver, comprising generating a display of at the least one roadway marker using the angle information, so that the display is largely identical to a marker on a road at the selected at least one intersection point; and to
    output the navigation instruction corresponding to the ascertained maneuver on the display device.

15. A vehicle with the navigation system according to claim 14.

* * * * *